United States Patent [19]
Marsch
[11] 4,201,718
[45] May 6, 1980

[54] PRODUCTION OF HARDBUTTER

[76] Inventor: Jack T. Marsch, 373 Lyons Rd., Basking Ridge, N.J. 07920

[21] Appl. No.: 956,483

[22] Filed: Nov. 1, 1978

Related U.S. Application Data

[63] Continuation of Ser. No. 643,139, Dec. 22, 1975, abandoned.

[51] Int. Cl.[2] .......................... C11C 3/12; B01J 23/40
[52] U.S. Cl. .................................... 260/409; 252/472; 426/417
[58] Field of Search ........................ 260/409; 252/472; 426/417

[56] References Cited

U.S. PATENT DOCUMENTS 3,856,831 12/1974 Tateishi ............................... 260/409

*Primary Examiner*—John F. Niebling

[57] ABSTRACT

Method of producing hard butters by hydrogenating a fat or oil having an iodine value of 60 to 85 with a nickel catalyst containing 6 to 21 parts by weight of sulfur per 100 parts of nickel followed by a fractionation separation and recovery operation of the hydrogenated oils.

9 Claims, No Drawings

PRODUCTION OF HARDBUTTER

This is a continuation of application Ser. No. 643,139, filed Dec. 22, 1975 now abandoned.

This invention relates to an improved process of treating edible fats and oils and more particularly, relates to the preparation of confectioner's hard butter from vegetable oils.

Cocoa butter substitutes, also known as hardbutters or confectioners' hardbutters are employed as the fat ingredient in the manufacture of candy and cooky coatings, icings, and fillings for candies, cookies and other confections. In candy manufacture, for example, cocoa butter has long been employed as the naturally occurring confectioners' hard butter. This fat is characterized by its sharp melting properties, its quality to break sharply and suddenly, that is, its "snap" at 70° F. and slightly above, and its ability to melt rapidly and completely at body temperature. These products must further provide good eating qualities.

Very few natural fats have the necessary properties and accordingly many processes have been developed for preparing such products from the more readily available fats and oils and specifically it has already been attempted to impart hard butter characteristics to other oils.

In accordance with the invention, it has been found that improved hard butters can be obtained by hydrogenating a fat or oil having an iodine value of 60 to 85 with a nickel catalystccontaining 6 to 21 parts by weight of sulfur per 100 parts of nickel, followed by a fractionation separation and recovery operation of the hydrogenated oils.

The hydrogenation (and also rearrangement) is carried out under conditions which induce the conversion of unsaturated fatty acid radicals of the oils from the cis configuration of the trans configuration, e.g. the conversion of cis-oleic acid to trans-oleic acid. The hydrogenation is carried out not only to effect this change in configuration but also to lower the initial unsaturation to the point where substantially all remaining unsaturation is monoethenoic in character. Since the starting oils are composed mainly of triglycerides having stearic, oleic, linoleic, linolenic, palmitic and other hydrocarbyl fatty acid radicals in their make-up, the hydrogenation serves to eliminate most, if not all, flavor-instability of the types due to residual polyethenoic unsaturation. In attaining this end, however, the hydrogenation treatment also brings about substantial configurational changes in various of the originally unsaturated fatty acid radicals, with the result that trans rather than cis forms of those acid radicals are present in sizable amounts. The trans forms should generally constitute at least 20% by weight of the total acids in the starring oil(s). Thus, the initial level needs to be adjusted in accordance with the process which is employed to separate and recover the desired hard butter fraction. The hydrogenation thus is carried under selective conditions to give the trans isomer by employing hydrogen at elevated pressures and a low activity catalyst, such as a sulfur treated nickel catalyst, or a nickel subsulfide catalyst.

When a conventional nickel hydrogenation catalyst is used, even under so-called "selective conditions" (i.e., low hydrogen pressure and high catalyst concentration), it is more difficult to obtain elaidinization of fats having lower iodine value than with a fat having higher iodine values because the relative easiness of elaidinization is generally proportional to the magnitude of the iodine value. During the hydrogenation step in processes using a nickel catalyst, there is an unavoidable trans-isomerization of the double bonds of the raw fats or oils so long as the iodine values thereof are above 0. Hydrogenated products prepared from fats or oils having high iodine values have a higher transisomer content than those prepared from fats and oils having low iodine value. However, it is well recognized that, after the trans-isomer content has reached a maximum during hydrogenation, the decrease in iodine value can result in a reduction in the trans-isomer content because a nickel catalyst can hydrogenate the trans-isomers. Thus, conventional nickel catalysts are generally inadequate for producing a hydrogenated product having a high trans-isomer content from oils or fats having low iodine value.

According to this invention, a fat or oil having an iodine value in the range of 60 to 85 is hydrogenated with a nickel catalyst containing about 6 to 21 parts by weight sulfur per 100 parts of nickel until the absorption of hydrogen has substantially ceased. The hard butters produced in accordance with this invention have excellent resistance to fat bloom, have good melting properties, and can be used in the manufacture of chocolate and confectioneries, either as a substitute for cocoa butter or in admixture with cocoa butter, without tempering.

As mentioned above, the starting fats or oils used in this invention have an iodine value within the range of 60 to 85, preferably within the range of 65 to 73. Fats or oils having iodine values less than 60 do not have sufficient double bonds to be isomerized during hydrogenation and contain tri-saturated glycerides which produce a waxy taste. On the other hand, fats or oils having iodine values greater than 85 contain too many double bonds to be isomerized during hydrogenation, causing isomerization to terminate before the desired hardening in the resultant product is produced.

A wide variety of natural and synthetic fats or oils having these properties can be used, representative examples of acceptable fats and oils include a refined oil or fat, such as lard; hydrogenated oils and fats prepared from oils having higher iodine values, such as soy bean oil, cotton seed oil, and olive oil; fractionated oils or fats prepared from palm oil or beef tallow; and synthetic fats or oils, such as those prepared by interesterifying soy bean oil or hydrogenated soy bean oil and palm oil or a palm oil fraction. In order to enhance the physical properties of and provide a higher trans-isomer content in the resultant hard butter product, the starting fat or oil preferably contains combined $C_{16}$ and/or $C_{18}$ fatty acids and, more preferably, contains about 25 to about 50 wt. % of combined $C_{16}$ fatty acids, based on the total combined fatty acids in the fat or oil.

The catalyst of this invention is a modified nickel catalyst containing from 6 to 21 parts by weight of sulfur per 100 parts of nickel and differs from a conventional nickel hydrogenation catalyst in its ability to promote trans-isomerization. That is, the catalyst of the invention does not substantially hydrogenate the trans-form double bonds, particularly those of elaidic acid. Accordingly, when the trans-isomer content of the hydrogenated fat or oil reaches a maximum during hydrogenation, hydrogen absorption substantially ceases.

The inclusion of catalytic poisons such as sulfur, selenium, nitrous oxide and sulfurous acid, by themselves in the hydrogenation reaction can cause cleavage of the glycerides from the starting oil and fat and/or impart an undesirable off-flavor to the resultant product. Quite unexpectedly then, the catalyst of this invention does not produce these undesirable results even though it contains such a poison, i.e. sulfur.

In order to provide the degree of hydrogenation required to produce the desired hard butter, it is essential that the sulfur content of the catalyst to be within the above defined range. If the sulfur content is less than 6 parts by weight per 100 parts of nickel, the catalyst is too active and will readily hydrogenate trans-oelic acid (elaidic acid) to stearic acid, thereby producing a resultant hydrogenated product having a relatively large amount of a high melting portion which causes a waxy paste. If the sulfur content is greater than 21 parts by weight per 100 parts of nickel, the catalyst is too inactive to produce the desired hydrogenation within a practical time period and can cause the starting fats or oils to decompose and release free fatty acids.

The catalyst of this invention can be prepared in any suitable manner. For example, it can be prepared by subjecting a conventional reduced nickel hydrogenation catalyst to an atmosphere containing hydrogen sulfide for a sufficient time to obtain the desired sulfur content. More practically, the catalyst can be prepared by subjecting a nickel compound, such as the oxides, hydroxides or carbonates thereof, to a reduction reaction, such as subjecting it to hydrogen gas under heating, and then placing in a mixed gas stream containing hydrogen and hydrogen sulfide until the desired sulfur poisoning is obtained. Preferably, the nickel compound is suspended in a carrier material, such as diatomaceous earth.

The amount of catalyst employed for the hydrogenation is in the range of about 0.1 to about 3, preferably about 0.3 to 1, weight percent, based on the total weight of the starting fat or oil. The hydrogenation temperature used should be in the range of about 160° to about 220° C., preferably about 180° to 195° C., the starting fat or oil is decomposed, causing the release of free fatty acids and an unpleasant odor.

The hydrogenation is continued until absorption of hydrogen substantially ceases. That is, the hydrogenation is decreasing until the iodine value of the hydrogenated product is decreased at a rate of about 1 per hour, preferably less than about 0.5 per hour. Since the catalyst of this invention does not hydrogenate transform double bonds, especially those of monoethenoic acid, the degree of hydrogenation is easily controlled and the over hydrogenation, i.e. over absorption of hydrogen, normally produced in prior art processes is prevented. The length of time for hydrogenation and the degree of hydrogenation depends to a large degree on the sulfur content of the catalyst and the iodine values of the starting fats or oils.

After completion of the desired hydrogenation, the reaction product is cooled below 80° C. and the catalyst is separated therefrom in a suitable manner. If desired, the hydrogenated product can be fractionated into three melting point portions in the usual manner with a solvent, such as methyl ethyl ketone, acetone, hexane, nitropropane, and the like, to obtain better hard butter. Since the hydrogenated product itself is suitable for hard butter, a higher yield of medium melting portion is obtained by fractionation. This fractionation is preferably carried out stepwise, first cooling to 15° to 25° C. and then cooling 5° to −10° C.

The hard butter produced by this invention has superior melting properties and can be used to manufacture chocolate or the like without the necessity for tempering. Also, the hard butter exhibits excellent resistance to fat bloom, particularly when used in admixtures with cocoa butter.

It has been found that a fractionation technique is the most effective means for separating the particular oils manifesting the characteristics of hard butters from the other components which do not possess such characteristics.

In this connection it has been found that the conventional fractionation procedures can be utilized, the same being varied so that the desired fractions are recovered, i.e., so that a product is recovered having the qualities of hard butter.

Thus in accordance with a further aspect of the invention it has been found that a fractionation treatment serving to separate a soft or liquid fraction from the remaining higher melting stock provides a hard butter fraction, i.e. the soft or liquid fraction having the desired properties.

The starting oils for the fractionation are the oil products obtained in the hydrogenation-rearrangement containing at least 20% and preferably 30% of the transisomer and substantially no polyethenoic unsaturation and only controlled amounts of monoethenoic unsaturation. The elimination of the polyethenoic saturation results in a hard butter of good keeping quality.

In accordance with a further aspect of the invention it has been found advantageous to employ for the fractionation oils or fats characterized by a steep dilatation values are achieved by conducting the hydrogenation under conditions whereby oils having the value at 20° C. of not less than 1400 are achieved.

The catalyst according to this invention was prepared by reducing nickel oxide suspended in diatomaceous earth with a stream of hydrogen gas and then subsequently contacting it with a mixed gas stream containing hydrogen and hydrogen sulfide. The resultant catalyst contains 47 wt. % nickel, 5 wt. % sulfur and 48 wt.% of the carrier.

The following Examples are given in order to more fully illustrate the invention and are not to be construed in limitation thereof.

EXAMPLE 1

3040 Grams of cottonseed oil having an iodine value of about 85 is mixed with 12.2 grams of a selective nickel catalyst prepared as set out above. Hydrogen is introduced into the system while a temperature of 134° to 137° C. is maintained for about 4¾ hours. The resulting oil has an iodine value of 53.7.

EXAMPLE 2

250 Grams of the hydrogenated oil from Example 1 is dissolved in 1000 grams of acetone at a temperature of about 35° C. The solution is cooled to 15° C. and held at said temperature for 45 minutes. The mass is filtered, the solid material being fraction A.

The filtrate is cooled to 2° C. and held at said temperature for about 50 minutes, causing precipitation of a hard butter, which is fraction B. The product is filtered off and steam deodorized at a temperature of 210° C., for two hours at a vacuum of about 3 mm mercury pressure. The mother liquor contains fraction C, which can be isolated by the evaporation of the solvent. All of the fractions are dried at 110° C. for about two hours.

The yield of hard butter (fraction B) amounted to 75 to 80%. When the conventional nickel catalyst was used, the yield amounted to only about 35%.

I claim:

1. A process for preparing a hard butter, which is suitable for use as a cocoa butter substitute in the manufacture of confectioneries without tempering, comprising hydrogenating a fat or oil having an iodine value within the range of 60 to 85 with a nickel catalyst containing 0.6 to 21 parts by weight sulfur per 100 parts of nickel until the absorption of hydrogen has substantially ceased.

2. A process according to claim 1 further including solvent fractionating the resultant hydrogenated product to obtain a medium melting portion.

3. A process according to claim 2 wherein said fractionation is carried out in two steps, first cooling the solution to 15° to 25° C. and then cooling the solution to 2° to −10° C.

4. A process according to claim 1 wherein said catalyst is prepared by subjecting a reduced hydrogenation catalyst to an atmosphere containing hydrogen sulfide for a sufficient time to add the desired sulfur content thereto.

5. A process according to claim 1 wherein said catalyst is prepared by contacting a reduced nickel catalyst with a mixed gas stream containing hydrogen and hydrogen sulfide for a sufficient time to add the desired sulfur content thereto.

6. A hard butter prepared by the process of claim 1.

7. A hard butter prepared by the process of claim 2.

8. The process according to claim 1 wherein the amount of catalyst employed is within the range of about 0.1 to about 3 wt. %, based on the total weight of the starting fat or oil.

9. A process according to claim 8 wherein the hydrogenation is carried out at a temperature in the range of about 160° to about 220° C.

* * * * *